United States Patent [19]

Wilkinson

[11] 4,385,879
[45] May 31, 1983

[54] REPAIR OF GLASS PANEL

[76] Inventor: Kenneth L. Wilkinson, 14875 SW. 79th, Tigard, Oreg. 97223

[21] Appl. No.: 94,944

[22] Filed: Nov. 16, 1979

Related U.S. Application Data

[63] Continuation of Ser. No. 893,751, Apr. 5, 1978, abandoned.

[51] Int. Cl.³ .......................... B32B 35/00; B29F 5/00
[52] U.S. Cl. ........................................ 425/12; 425/13; 264/36
[58] Field of Search ........................ 425/11, 12, 13, 14, 425/110

[56] References Cited

U.S. PATENT DOCUMENTS

| 1,926,415 | 9/1933 | Wertz | 425/13 |
| 2,837,767 | 6/1958 | MacDonald | 425/13 |
| 3,571,857 | 3/1971 | Rhyne | 425/110 X |
| 4,032,272 | 6/1977 | Miller | 425/12 |
| 4,047,863 | 9/1977 | McCluskey et al. | 425/13 |

Primary Examiner—J. Howard Flint, Jr.
Attorney, Agent, or Firm—Kolisch, Hartwell & Dickinson

[57] ABSTRACT

Apparatus for repairing a damaged area in a glass panel including a frame which attaches to the panel with suction cups and a barrel supported by the frame used to receive glass-repair liquid. A plug is inserted into the barrel which has an end face which shapes the repair liquid.

7 Claims, 11 Drawing Figures

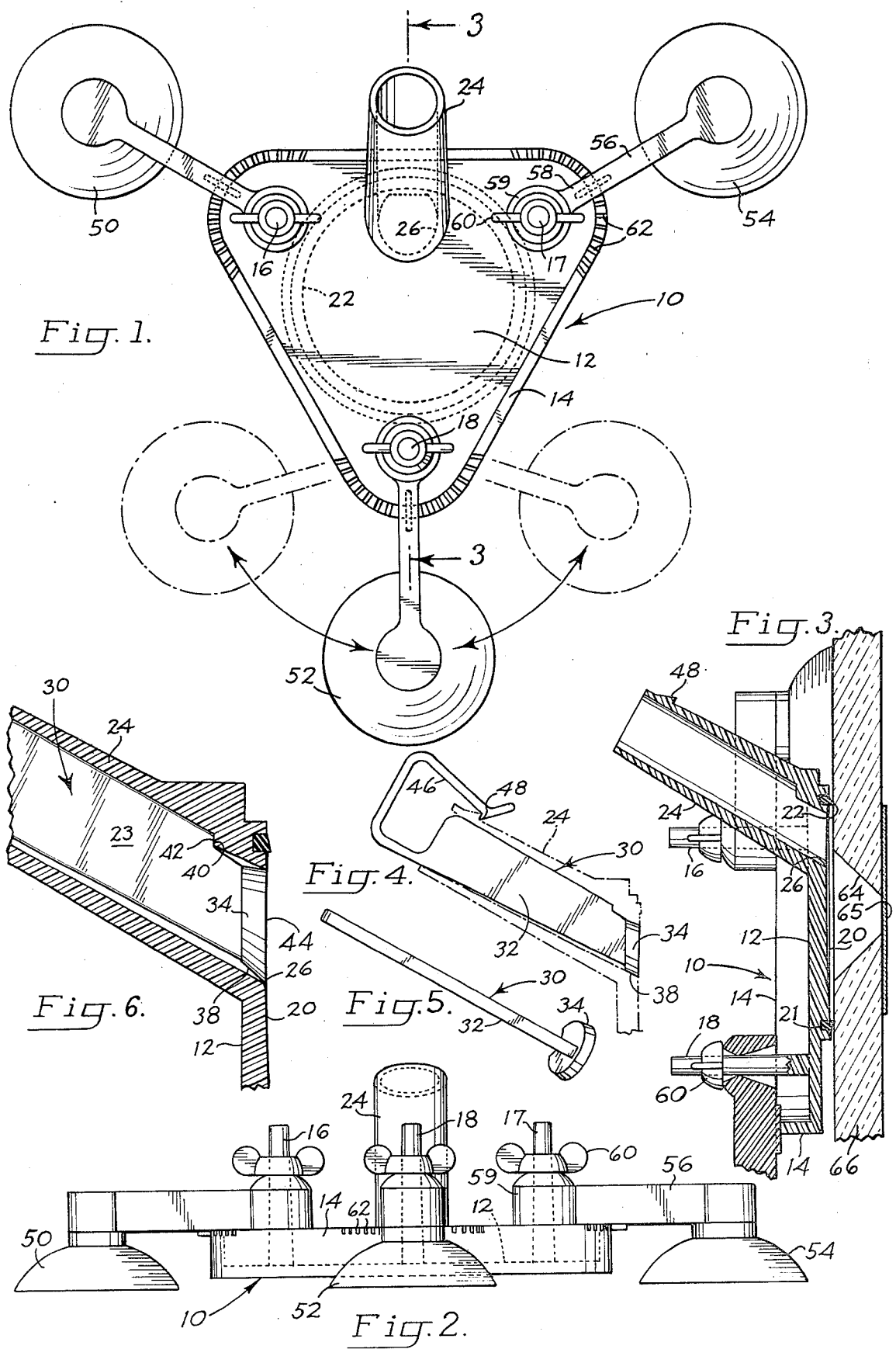

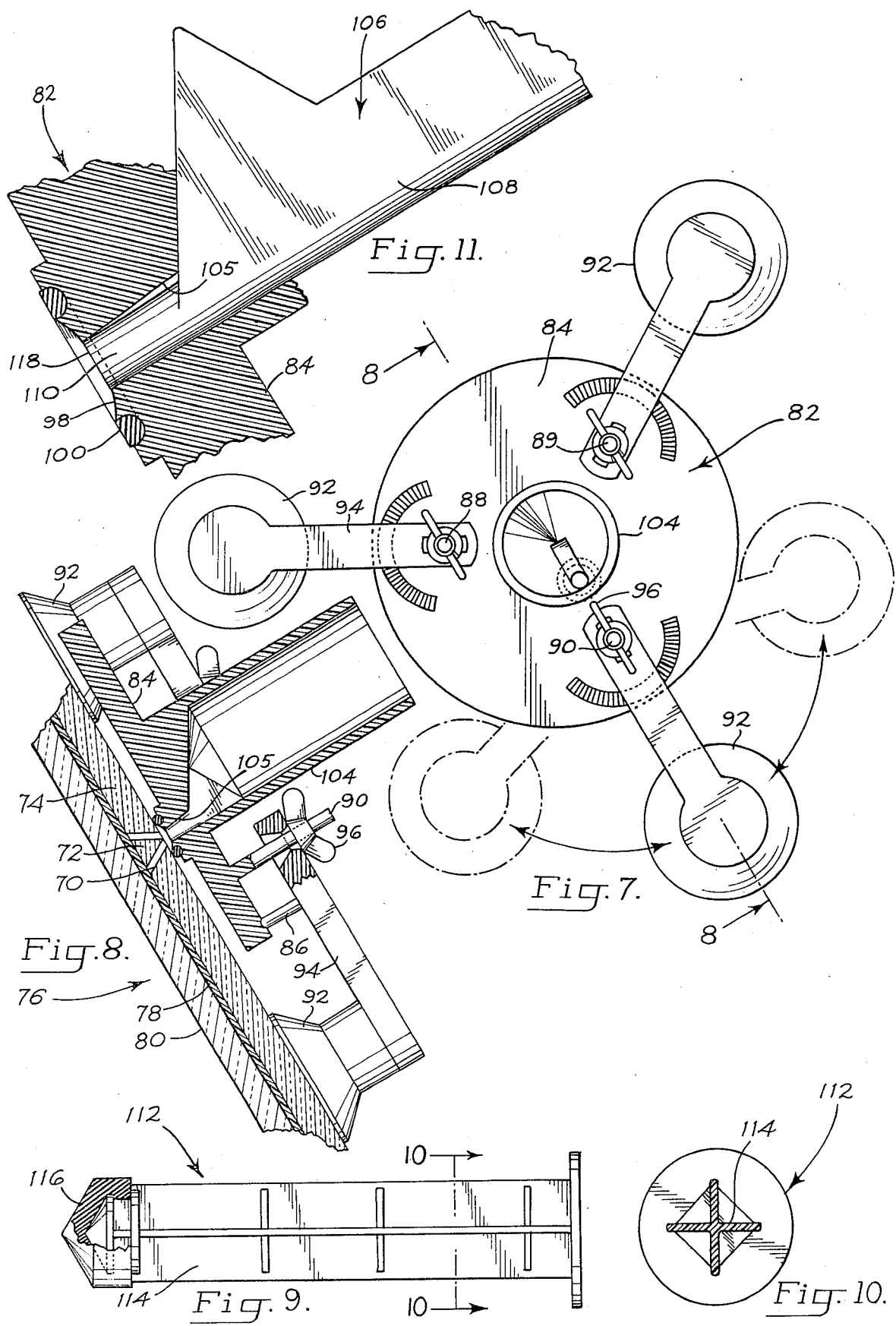

REPAIR OF GLASS PANEL

This application is a continuation of application Ser. No. 893,751 filed Apr. 5, 1978 entitled REPAIR OF GLASS PANEL now abandoned.

BACKGROUND AND SUMMARY OF THE INVENTION

This invention relates to apparatus for repairing a damaged area in a glass panel.

A number of different methods and devices have been proposed in the past for repairing damaged areas in a glass panel, such as a plate glass window, or the common safety glass which is found in windshields of automobiles. The greatest portion of damage to a glass panel takes the form of a hole of frusto-conical configuration. In plate glass, the hole extends entirely through the glass panel, whereas in safety glass the hole extends to the plastic film which forms an internal lamina in the safety glass. The repair techniques have involved introducing a hardenable resin glass-repair liquid into the damaged area, with such liquid on hardening forming a transparent filler in the damaged area. Exemplary of prior approaches are those enclosed in Shol, U.S. Pat. No. 3,562,366; Forler et al. U.S. Pat. No. 3,914,145; and Hollingsworth, U.S. Pat, No. 3,765,975.

Difficulties have been encountered using prior approaches in repairing glass panels. For instance, using one method, the hardenable repair liquid should be applied in an excess to produce a suitable fill in the damaged area, and this excess must be cut or otherwise removed from the glass near the end of the repair operation. Such is time consuming and difficult to do without leaving evidence on the glass panel of where the repair is located. Equipment utilized in making repairs many times is relatively expensive, and a clean-up problem is presented after the completion of the repair. With most approaches, unless considerable skill is exercised by the person making the repair. Imperfect results are produced.

A general object of this invention is to provide improved apparatus adapted for the making of a repair in a glass panel, which renders the making of the repair relatively simple and performable by persons of only ordinary skill.

Another object is to provide a novel method for repairing a glass panel.

Another object is to provide apparatus for the repair of a damaged area in a glass panel which is effective to produce a repair which on completion is substantially indiscernible on the panel.

Another objective is to provide a glass repair apparatus or kit which may be produced at a relatively low cost and which therefore may be discarded after the making of a repair. This eliminates the necessity of any clean-up in the apparatus used in making the repair.

Another objective is to provide apparatus for the repair of a glass panel which is effective to make a repaired area which will stand up over a long period of time, a particularly important consideration, for instance, in the repair of a windshield which is subject to prolonged periods of vibration during the life of the windshield.

These and other objects and advantages are attained by the invention, which is described here and below in conjunction with the accompanying drawings, wherein:

FIG. 1 is a top plan view of apparatus as contemplated, showing a frame in the apparatus, and suction cup devices disposed on the outside of the frame;

FIG. 2 is a side elevation of the apparatus shown in FIG. 1;

FIG. 3 is a cross-sectional view taken along the line 3—3 in FIG. 1 and showing the apparatus on a glass panel;

FIG. 4 illustrates a removable plug that forms part surface 20 is an annular groove 21 and an annular seal or sealing of the apparatus;

FIG. 5 is another view of the plug;

FIG. 6 is an enlargement of portions of the frame shown in FIG. 3;

FIG. 7 is a plan view of another modification of the invention;

FIG. 8 is a cross-sectional view taken along the line 8—8 in FIG. 7 and showing the apparatus on a windshield;

FIG. 9 illustrates a plunger used with the device shown in FIG. 7;

FIG. 10 is a cross-sectional view taken along the line 10—10 in FIG. 9; and

FIG. 11 is an enlarged cross-sectional view of portions shown in FIG. 8; and further illustrating portions of a removeable plug.

Referring now to the drawings, and more particularly to FIGS. 1 through 3, wherein one embodiment of the invention is illustrated, the apparatus comprises a frame 10 which has a substantially triangular outline viewing the frame in plan. It has been found that a triangular shape is readily fitted on most areas on an installed glass panel, but this is not to say that the frame could not take other shapes, such as circular, etc. Typically the frame may be of a plastic material.

Frame 10 includes a web of material 12 forming the base of the frame. Integrally joined to this web and extending around the perimeter of the frame is an upstanding flange portion 14. Also joined to the web adjacent three corners of the frame are three posts 16, 17, 18.

Web 12 along the bottom thereof has a smooth surface 20. As can be seen in FIG. 3, this surface may be given a slightly concave shape, although this concavity is very slight, the surface being essentially planner. Adjacent the periphery of surface 20 is an annular groove 21 and an annular seal or sealing ring 22 of elastomer or other yieldable material seats within this groove. The outer face of the sealing ring and surface 20 together form what is referred to herein as a face expanse presented at the base of the frame, with ring 22 forming a peripheral boundary of the expanse. Surface 20 inwardly of ring 22 is slightly behind the plane of ring 22.

Also part of the frame is what is referred to herein as a barrel or hollow tube 24 which preferably lies at an incline relative to the general plane of the face expanse. Web 12 includes a hole or opening 26 communicating with the interior of tube 24 adjacent where the tube joins with the web. This opening may have a smaller area than the cross-sectional area of the tube or barrel. Opening 26 is inwardly of sealing ring 22 which forms the periphery or boundary of the face expanse at the bottom of the frame. Surface 20 is unbroken save for opening 26.

Indicated at 30 in FIGS. 4 and 5 is a plug which is a separate piece from the frame. The plug includes an elongated stem 32 and an end portion 34 adapted to seat within opening 26. Margin 38 of end portion 34 is beveled and diverges from the margin of hole 26 with the end portion seated within the hole. Also defining a seated position for the plug is a shoulder 40 provided in the stem and a ledge 42 defined in the barrel 24.

From the construction described, it should be obvious that the plug is insertable into the tube or barrel and may be moved to a fully seated position wherein end portion 34 closes off opening 26. Serving also to define this seated position is shoulder 40. With the plug in a seated position, smooth end face 44 of the end portion forms a smooth continuation of bottom surface 20 of web 12. It should further be obvious from viewing FIG. 6 that since margin 38 of end portion 34 diverges from the surface defining hole 26, liquid may escape around end portion 34 upwardly into the warren until such time as the plug reaches its fully seated position.

The plug may also include a clip 46 integral with the stem 32 engageable with a shoulder 48 provided on the outside of the barrel. This clip holds the plug in place once the plug has been placed in its seated position.

The frame is secured to a glass panel using suction cups 50, 52, and 54. Each has an arm 56 connected to the top of the suction cup which extends from the cup and includes an end portion 58 located over the frame. An intermediate part of the arm rests on flange portion 14. End portion 58 is shaped with a collar 59 which fits about a post in frame 10. Self-threading wing nut 60 screwed onto a post constitutes adjustable means for drawing end portion 58 of an arm toward the frame with the arm pivoting on flange portion 14, such constituting a fulcrum edge.

The arms may be positioned at various outreaching angles relative to the frame. The upper margin of flange 14 is notched, as shown on 62, to provide selected seated positions for an arm.

The usual damage in a glass panel may be represented by the frusto-conical cavity shown at 64 in panel 66. In making a glass repair, the glass panel is first thoroughly cleaned. The frame is then placed on the panel with its face expanse positioned adjacent and opposite the glass panel and the margin of this face expanse (sealing ring 22) snugly engaging the surface of the panel in a region circumscribing and spaced laterally outwardly of the larger diameter end of the damaged area. The frame is positioned so that the barrel or tube has an upward incline. The frame is further positioned so that opening 26 communicates with cavity 64 adjacent to the top of the cavity. With the frame properly positioned the various suction cups are pressed against the surface of the panel being repaired and the frame brought into tight engagement with the panel through a leveraging action forcing the frame against the panel. Tape 65 is placed over the smaller diameter end of the cavity.

With the frame so positioned, surface 20 which functions at a smooth mold surface is sealed to the panel surface in a zone which surrounds and it spaced laterally outwardly of the margins of cavity 64. This zone encompasses an area of the mold surface which is out of contact with the panel surface and which is of larger size than the area of the damaged region or cavity. The mold surface when so positioned defines with the panel surface a thin void which surrounds cavity 64 and which joins with this cavity.

Hardenable glass-repair liquid may then be introduced into the thin void above described and cavity 64 by pouring such into the top end of barrel or tube 24. The amount of liquid introduced slightly exceeds the amount required to fill the cavity. With the liquid introduced, plug 30 is inserted into the barrel or tube and moved to a seated position therein. The liquid is then permitted to harden with face expanse 20 and end face 44 of the plug providing a mold surface shaping the outer surface of the material which forms the filler for the cavity.

After hardening the apparatus described may be loosened and then removed from the panel undergoing repair. A deposit of transparent fill material is produced which fills cavity 64, which deposit over the outer side thereof has a smooth surface. This deposit forms a marginal overlay on the glass on the panel, adjacent to margins of the former cavity.

FIGS. 7 through 11 illustrate another embodiment of the invention useable in the repair of so-called safety glass as found in an automobile windshield. As shown in FIG. 8, typical of nearly all pock-marked safety glass is a conical open tipped cavity 70 containing a conical glass segment 72 in outer glass lamina 74 of safety glass panel 76. The panel further includes a central plastic film 78 and an inner glass lamina 80.

In the device shown in FIGS. 7 through 11, the apparatus again includes a frame 82, a web 84, and posts 88, 89, 90 projecting upwardly from the web. The device is secured to a glass panel using suction cups 92, arms 94 and wing nuts 96. Each arm includes a downwardly projecting fulcrum post such as shown at 86. At the base of the frame is a slightly concave surface 98 surrounded by an annular sealing ring 100, the ring and surface 98 also being referred to herein as a face expanse. In repairing the panel, the frame is mounted with the face expanse overlaying the open end of cavity 70.

In the embodiment shown in FIGS. 7 through 11, the tube or barrel 104 may be normal to the general plane of the face expanse (most windshields are inclined as mounted in a vehicle).

The apparatus of FIGS. 7 through 11 in addition to employing a plug which is shown at 106 and includes a stem 108 and end portion 110, also is provided with a plunger such as shown on 112. The plunger is provided with a rigidized stem 114 and an elastomer head 116 which fits snugly with the inside of the barrel.

In utilizing the apparatus shown in FIGS. 7 through 11, the frame as already explained is placed on the glass panel to be repaired with its face expanse overlying the open tipped cavity and ring 100 circumscribing an area including the open tip of the cavity. Liquid is introduced into the cavity by pouring such into the barrel, whence such flows through opening 105 into the region to be repaired. Enough liquid is introduced to fill the cavity and at least the bottom part of barrel 104.

The plunger 112 is then fitted into the barrel and moved into and away from the pool of liquid which resides at the base of the barrel. This serves to impart pressure and then suction to the liquid within the damaged area. Such tends to impart motion to the glass segment within the cavity, and to promote complete filling of the space in the cavity about the outside of the segment with repair liquid, and the removal of any entrapped air within the cavity. After it is observed that all entrapped air has been removed, the plunger is removed from barrel 104. Plug 106 then is introduced into the barrel and seated to place its end portion 110 in a position closing opening 105. Again with the plug in a seated position, its bottom face 118 forms a continuation of the face expanse in the device.

After hardening of the repair liquid, the device is removed from the panel under repair. As in the case of the first modification of the invention described, a fill deposit results which is transparent and has a smooth outer surface which blends closely with the remainder of the panel.

With the three adjustable arms provided, and the mounting for such arms which enables each to swing about a fulcrum point provided by post 86, the device described is readily secured to safety glass. Be it curved or flat, and to substantially any area of such glass.

Variations and modifications of the device, other than those described, should be obvious to one skilled in the art.

It is claimed and desired to secure by letters patent:

1. Apparatus for repairing a damaged area in a glass panel comprising, a frame and securing means for detachably securing the frame to one side of the panel with the frame overlying the damaged area in the panel and with the securing means located on said one side of the panel.

said frame including means forming a face expanse which, with the frame in operative position secured to the glass panel, lies opposite the glass panel, said means forming a face expanse including an annular sealing portion forming the peripheral boundary of the face expanse which sealing portion occupies a plane and is adapted sealingly to engage the glass panel in a region circumscribing and spaced laterally outwardly of the damaged area, said face expanse laterally inwardly of said sealing portion having an opening therein which opening is surrounded by the face expanse and the face expanse inwardly of said sealing portion extending as a smooth surface unbroken save for said opening and which is behind said plane, said frame further having means defining a passage communicating with said opening, said passage and opening affording an access path for the introduction of hardenable glass repair liquid to said damaged area, a plug insertable into said passage and means defining a seated position for said plug in said passage, said plug having an end face which fills said opening with the plug in its seated position in said passage, said end face, with the plug in its seated position being a smooth continuation of said face expanse surface and lying over the damaged area and shaping the hardenable repair liquid.

2. The apparatus of claim 1, wherein said means defining said passage includes an elongate hollow tube, and said end opening has a smaller area than the cross-sectional area of said tube.

3. The apparatus of claim 1, wherein the means for detachably securing the frame to the panel comprises a suction cup located laterally of the periphery of the frame, an arm connected to the suction cup extending from the cup and including a portion located over the frame, and means for securing said portion of said arm and frame together.

4. The apparatus of claim 3, wherein said frame includes a fulcrum edge, said arm extends from the cup over said fulcrum edge to said portion of the arm which is located over the frame, said arm resting on said fulcrum edge, said means for securing said portion of said arm and the frame together including adjustable means operable to draw said arm portion toward said frame with the arm pivoting on said fulcrum edge.

5. Apparatus for repairing a damaged area in a glass panel comprising, a frame adapted to be secured to the glass panel including means forming a face expanse which lies adjacent and opposite the glass panel with the frame secured to the glass panel said face expanse including annular sealing means forming the peripheral boundary of the expanse which sealing means occupies a plane and is adapted snugly to engage the glass panel in a region circumscribing the damaged area, said face expanse laterally inwardly of said sealing means having an opening therein which is surrounded by the face expanse and the face expanse inwardly of said sealing means extending as a smooth surface unbroken save for said opening and which is behind said plane, said opening providing access to the damaged area in the panel, a detachable plug having an end face, and means defining a seated position for said plug on said frame, said end face with the plug in its seated position filling said opening and forming a smooth continuation of said face expanse surface.

6. The apparatus of claim 5, wherein the frame further includes a hollow tube communicating at one end with said opening, and said plug is loosely fittable in said tube, said opening having smaller area than the cross-sectional area of the tube.

7. The apparatus of claim 6, wherein said tube lies at an incline relative to the general plane of said face expanse.

* * * * *